US012052552B2

United States Patent
(12) United States Patent
Borowski et al.

(10) Patent No.: US 12,052,552 B2
(45) Date of Patent: Jul. 30, 2024

(54) LIMITING DISTORTION OF ACOUSTIC RENDERING

(71) Applicant: Microsoft Technology Licensing, LLC, Redmond, WA (US)

(72) Inventors: Christopher Ian Borowski, Bellevue, WA (US); Eric Middleton, Seattle, WA (US); Chun Beng Goh, Bellevue, WA (US); Jani Samuli Kuivalainen, Redmond, WA (US); Dana William Bourke, Redmond, WA (US); Kevin Juho Venalainen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 17/587,662

(22) Filed: Jan. 28, 2022

(65) Prior Publication Data

US 2023/0247356 A1 Aug. 3, 2023

(51) Int. Cl.

*H04R 3/04* (2006.01)
*H04R 29/00* (2006.01)

(52) U.S. Cl.

CPC ............ *H04R 3/04* (2013.01); *H04R 29/001* (2013.01)

(58) Field of Classification Search

None

See application file for complete search history.

(56) References Cited

U.S. PATENT DOCUMENTS

| | | | | |
|---|---|---|---|---|
| 5,524,060 A * | 6/1996 | Silfvast | .................... | H03G 3/00 381/119 |
| 2010/0215193 A1 | 8/2010 | Wihardja et al. | | |
| 2013/0142360 A1 | 6/2013 | Potard | | |
| 2020/0176011 A1 | 6/2020 | Cassidy et al. | | |

FOREIGN PATENT DOCUMENTS

| | | |
|---|---|---|
| CN | 110933486 B | 8/2021 |
| KR | 20210052124 A | 5/2021 |

* cited by examiner

*Primary Examiner* — James K Mooney

(74) *Attorney, Agent, or Firm* — Holzer Patel Drennan

(57) ABSTRACT

A frequency-dependent signal limiter using a paired combination of a bandpass filter (or "selection filter") and an attenuating equalizing filter (or "cutting filter") limit the amount of distortion generated by an audio output device in an acoustic rendering system. A bank of one or more of these pairs in series can be used to limit selected frequencies identified as primary causes of distortion in the audio output device to specified levels that avoid distortion.

20 Claims, 7 Drawing Sheets

LIMITING DISTORTION OF ACOUSTIC RENDERING

BACKGROUND

Many devices include or are connected to acoustic rendering systems (e.g., loudspeakers and related driving amplifiers). The acoustic performance of an acoustic rendering system can depend on many factors, including the design of the amplifier, the signal produced, the gain or volume set by the user, the configuration of the speaker enclosure, or other acoustic, electrical, and mechanical aspects of the system design.

SUMMARY

Systems with audio output devices (e.g., loudspeakers) often have issues with distortion that is both signal level dependent and signal frequency dependent. To limit the amount of distortion generated by the acoustic system, the disclosed system and process implements a frequency-dependent signal limiter using a paired combination of a bandpass filter (or "selection filter") and an attenuating equalizing filter (or "cutting filter"). A bank of one or more of these pairs in series can be used to limit selected frequencies identified as primary causes of distortion in the audio output device to specified levels that avoid distortion.

In various implementations, a system or method limits distortion in an audio output device. A first bandpass filter may be applied to an audio signal for a first defined frequency range known to cause distortion in the audio output device, measures a signal level of the audio signal within the first defined frequency range may be measured. A difference between the measured signal level and the threshold level may be computed for the first defined frequency range. Filter coefficients may be generated based, at least in part, on the computed difference. The audio signal may be filtered using the generated filter coefficients applied to limit the signal level of the audio signal to reduce distortion in audible output of the audio output device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTIONS OF THE DRAWINGS

DETAILED DESCRIPTIONS

Many devices and systems have audio output devices in the form of acoustic rendering systems, e.g., loudspeakers, to provide sound output from an analog or digital audio input signal. Such devices and systems may include, for example, a portable radio, a car radio, a television, a home stereo or theater system, a desktop or laptop computer, a smartphone, a tablet computer, or an MP3 player. In each of these devices or systems, the audio output devices may be fully integrated within the hardware or external case of the device. In other instances, the audio output devices may be separate from and external to such devices, for example, stereo or surround sound speakers, external computer speakers, earphones, earbuds, and wireless speaker devices. As is apparent, the audio output devices may be physically wired to the device providing the source signal and amplification power, or the audio output devices may be wirelessly connected to the source signal device, e.g., via Bluetooth or other wireless protocol, in which case the audio output devices may require a separate source of power and amplification, e.g., an amplifier and battery contained within a common device enclosure.

An ideal audio output device would be able to create an exact reproduction in sound pressure of an input signal, but no audio output device is ideal. Loudspeakers are typically designed to have a flat signal response across the audible frequency spectrum. This means that loudspeaker design attempts to maximize the volume output with minimum audible distortion in the acoustic output across all frequencies. Unfortunately, many factors—including physical limitations of materials used to make loudspeakers (particularly inexpensive ones), as well as physical size (e.g., it is typically difficult to design headphones that can produce sufficient low frequency (bass) output volume) and enclosure design (e.g., within a smartphone or computer case)—all converge to impact desired acoustic response. Most loudspeakers will thus exhibit distortion at certain frequencies when the amplitude of the signal at those certain frequencies exceeds a threshold that implicates or exacerbates the nonlinearity of the loudspeaker design. Again, this distortion is typically more prevalent with small or low-cost loudspeakers but does affect all loudspeakers to some degree.

Figure 1:
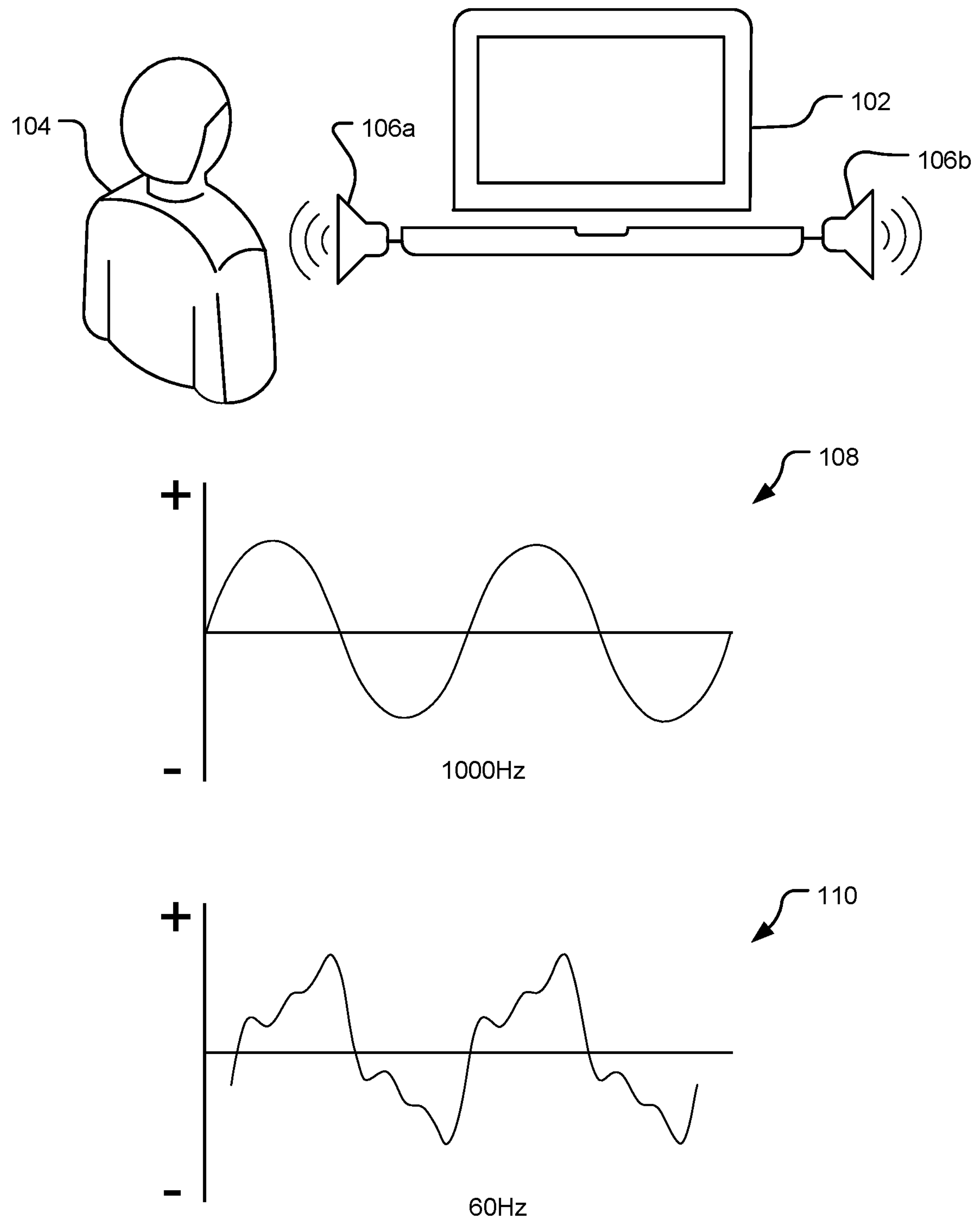
FIG. 1 is an example schematic diagram of a computing device with an acoustic rendering system emitting sound with distortion at a certain frequency.

FIG. 1 presents a pictorial example of frequency-specific distortion of a pair of internal loudspeakers **106*a/b* mounted within the case of a laptop computer 102. The user 104 of the laptop computer 102 hears the acoustical rendering of the audio playback (e.g., streaming music or video) modulated by the internal loudspeakers 106*a/b*. In this example, the audible output at a first frequency of 1000 Hz, represented on the first graph 108, is clean and free from distortion, as the smooth sine wave indicates. However, the audible output at a second frequency of 60 Hz, represented on the second graph 110, is distorted as the jagged form of the wave as it travels indicates. In this example, the low-frequency acoustic output is not clean and clear, but rather might exhibit a perceptible buzz or hum to the user 104 if the amplitude (or energy) of the input signal at the second frequency of 60 Hz is above a threshold that will cause a distorted response in the particular design of the internal loudspeakers 106***a/b* in conjunction with their enclosure. In a related example, the enclosure of the laptop computer 102, or other components therein, may negatively respond to certain acoustic frequencies output by the internal loudspeakers 106*a/b* when the loudness exceeds a threshold, thereby causing the laptop components to vibrate or buzz, which competes with the acoustic output of the internal loudspeakers 106*a/b* to create audible distortion noticeable by the user 104.

Figure 2:
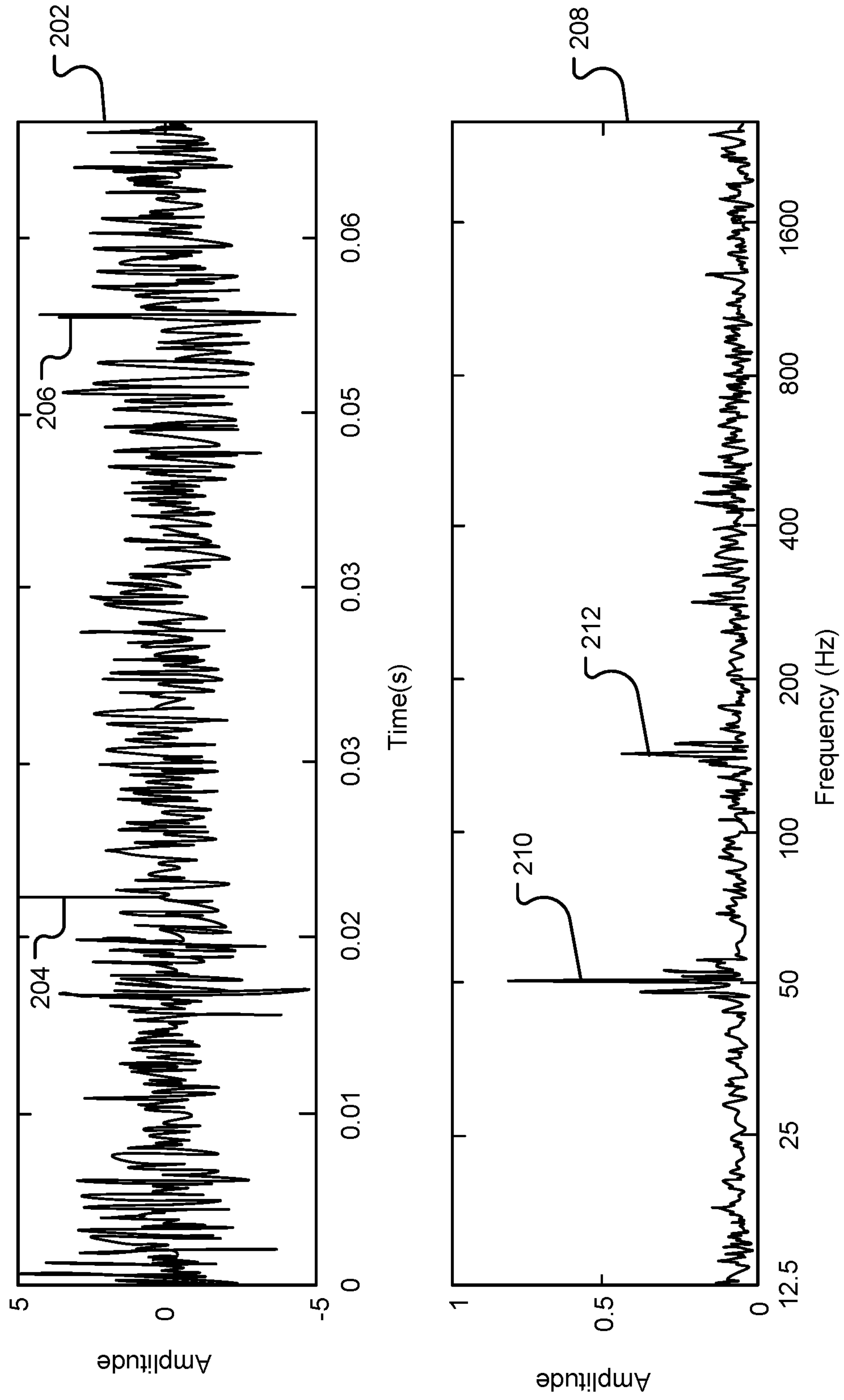
FIG. 2 depicts two example plots of an audio signal, first in signal strength vs. time and second in signal strength vs. frequency for a specific time, each indicating instances of high signal levels.

FIG. 2 depicts two graphs of an audio signal to visually demonstrate variations in signal amplitude (e.g., level or power) of an audio signal. In the first graph 202, a signal level (amplitude) of an input audio signal is plotted over a period of time (0.06 seconds). As depicted, the level of the audio signal fluctuates greatly over this short period, with signal level peaks indicated at locations 204, 206. The loudness of a sound wave created by an audio output device (e.g., a loudspeaker) is directly proportional to the amplitude of the input signal. Thus, the peaks 204, 206 are likely instances where the audio output device might render a distorted acoustical output if the amplitude exceeds a threshold for problem frequencies.

However, the first graph 202 does not provide any indication of particular frequencies in the input signal that may be at problematically high levels. The second graph 208 plots the amplitude of the signal level across a range of frequencies (12.5 Hz to 24 kHz, which is close to the frequency range of human hearing) for an instantaneous slice of time. As depicted, at this instant, the signal levels at approximately 50 Hz and 120 Hz (indicated by references 210, 212) are much higher than signal levels at other frequencies. These signal levels would translate into the output from an audio output device of a sound wave with greater loudness at about 50 Hz and 120 Hz than any other frequencies. These frequency spikes could cause distorted output from the audio output device, or they may be clearly output by the audio output device—it depends upon the particular design and environment of the audio output device design (e.g., is the audio output device prone to distortion at these frequencies) and the relative input signal level (e.g., if so, is the signal level above a threshold that results in distortion).

Identifying the presence or absence of distortion at certain frequencies in the output of an audio output device and the relative impact on sound quality perceived by a listener is both objective and subjective. Audio output devices (e.g., audio output devices) can be tested in a laboratory environment to determine their response to various frequencies across the audible spectrum at a range of signal levels. The output of the audio output device can then be analyzed using any of a number of standard audio processing devices and software that can detect the presence of distortion at frequencies across the spectrum (e.g., output frequencies with distorted tones of the type depicted in the plot 110 in FIG. 1). The analysis can also identify signal level thresholds above which distortion appears but below which there is no significant distortion. However, in some instances, a signal level at one frequency or a series of frequencies (which may or may not be extremely high) may produce a clear sound output at those frequencies, but also produce unwanted harmonics of those frequencies, resulting in distortion. Source frequencies of such harmonic distortion may be identified by the audio processing devices or software noted above, but in some instances, human trial and error may be necessary to identify the offending frequencies. Further, even though a frequency of sound output may be technically distorted, it may not be audibly significant or noticeable, or it may be masked by other frequencies. Thus, testing of audio output devices in their commercial embodiment or environment by a skilled audio engineer with proper testing equipment may be important to identifying problem frequencies and corresponding threshold signal levels for a specific audio output device design and product configuration.

Once one or more problem frequencies and related signal levels have been empirically and subjectively determined, it may be desirable to suppress the input signal level at these frequencies before the audio signal is sent to the amplifier and ultimately to the audio output devices. By suppressing the input signal level, e.g., preventing it from exceeding the known threshold level that causes distortion, a cleaner sound output (e.g., with little or no distortion) can be achieved in the audio output device. If the audio output devices are incorporated into a consumer device that has a processor and memory, e.g., a television, a desktop, laptop, o tablet computer, a smartphone, a self-powered loudspeaker, an equalization filter application can be stored in the memory, and the processor can be leveraged to provide signal equalization and attenuate problem frequencies to avoid distortion in the audio output device.

Prior processor approaches have been implemented to provide signal level suppression. One typical prior process involved using filter banks in a setup that resembles a multiband compressor or limiter. In this configuration, the entire input signal is split into multiple adjacent frequency bands. Each frequency band is metered and limited, and then the resulting bands are summed into a single output signal, for example, through a reconstruction filter depending on the design. Such multiband compressors are primarily used for boosting low signal levels rather than for limiting distortion. This approach has some drawbacks. First, every frequency in a particular frequency band is subject to the same threshold value, and all frequencies in the particular frequency band exceeding the threshold are compressed, regardless of whether the frequency exceeding the threshold is likely to cause distortion. When used for distortion limiting, multiband compressors generally have lower frequency selectivity, i.e., they limit a wider frequency range, resulting in unnecessary limiting of frequencies that do not cause distortion. Second, the selectivity (e.g., the frequency bandwidth of the limiting action) is determined by the crossover filter slope. Frequencies toward the outer edges of each band are limited less than frequencies in the center of the band because of the crossover curve, which generally peaks at the threshold in the center of the band and slopes downward on each lateral side. Third, the center frequency location and width of the limiting action are fixed, based at least in part, on the number of bands and the corresponding crossover design, e.g., filter slopes which are generally uniform across all the bands.

Another prior approach is to mathematically transform the input signal from the time domain into the frequency domain and split the signal into multiple adjacent frequency bins of equal width. Signal levels for frequency bins that exceed a threshold that could cause distortion can be limited by processing operations. Once any predetermined limits have been applied to appropriate frequency bins, the signal can be mathematically transformed back into the time domain for output to the amplifier and audio output devices. Frequency domain transformation also has significant limitations. First, there is a significant amount of processor demand to transform a signal from the time domain to the frequency domain, perform a limiting action, and return to the time domain in essentially real-time. In order to avoid significant latency in output, a dedicated audio processor would likely be required, adding to the cost of the device. In addition, such a processor would have a significant power demand. For devices running on batteries, e.g., a laptop computer, smartphone, tablet, Bluetooth speaker, etc., the power draw could significantly reduce the available operational time of the device before a recharge is necessary. Further, transformation to the frequency domain necessarily results in a quantized action of limiting filters. Each of the frequency bins created in the frequency domain is the same width and is a result of the mathematics of the transform function. Therefore, the limiting filter is centered on the midpoint of each bin, even if the problem frequency is on the edge of the bin range. The limit filter thus cannot be centered on the actual problem frequency and also cannot extend to adjacent frequencies if those are across the split in another adjacent, but separate, bin.

The system and process for limiting distortion in acoustic rendering systems disclosed herein provide significant and measurable advantages as compared to prior prescribed solutions. During the design and manufacturing process of a commercial device incorporating an audio output device (e.g., a loudspeaker), an audio engineer tests the audio output device in the product environment to identify likely frequencies that may cause distortion in the sound output. The sound engineer also determines the signal level threshold at which undesirable distortion is perceptible.

Figure 3:
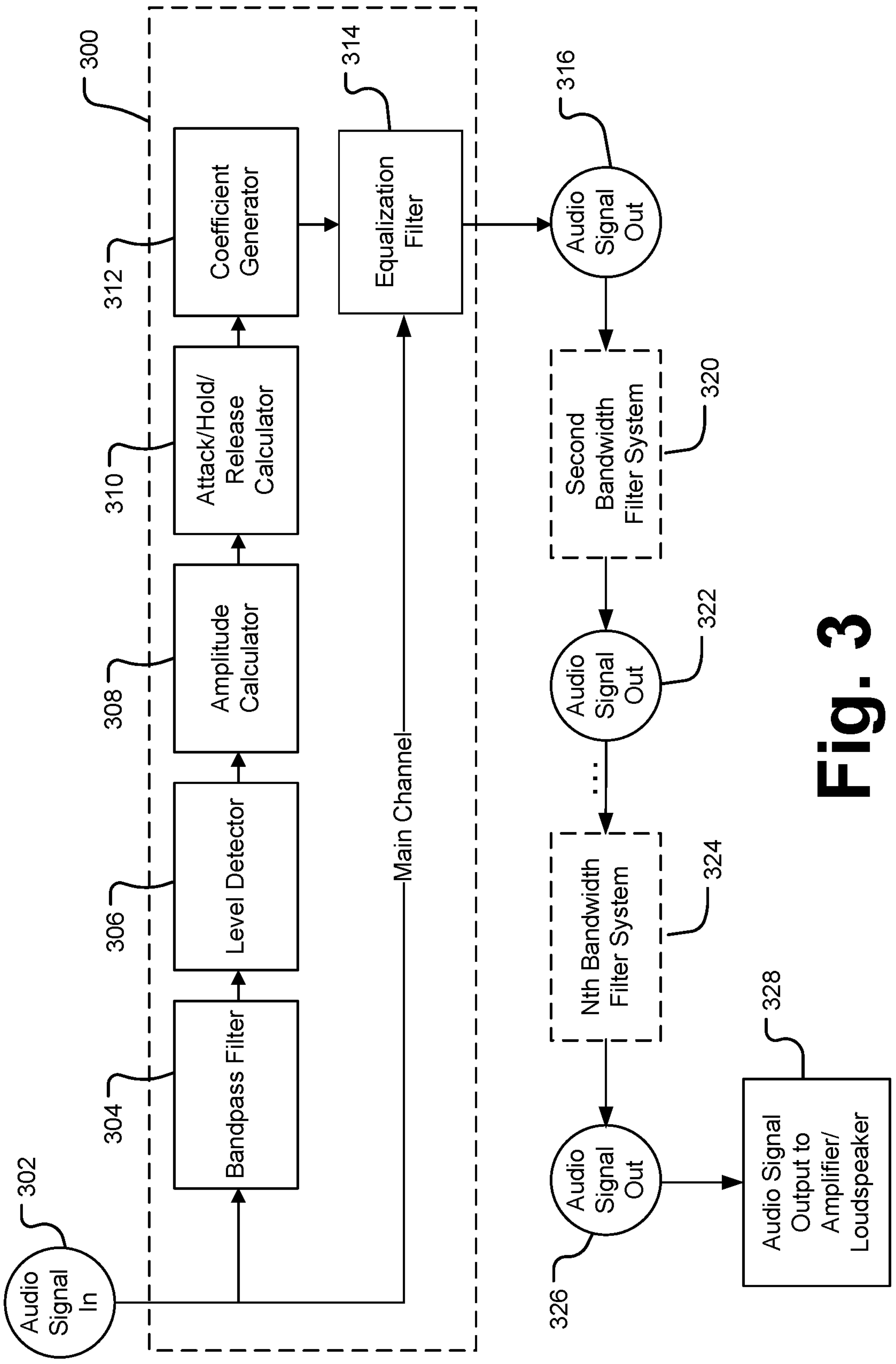
FIG. 3 is a schematic diagram of an example equalization filter disclosed herein for limitation of distortion of audio output in one or more audio output devices.
Figure 4:
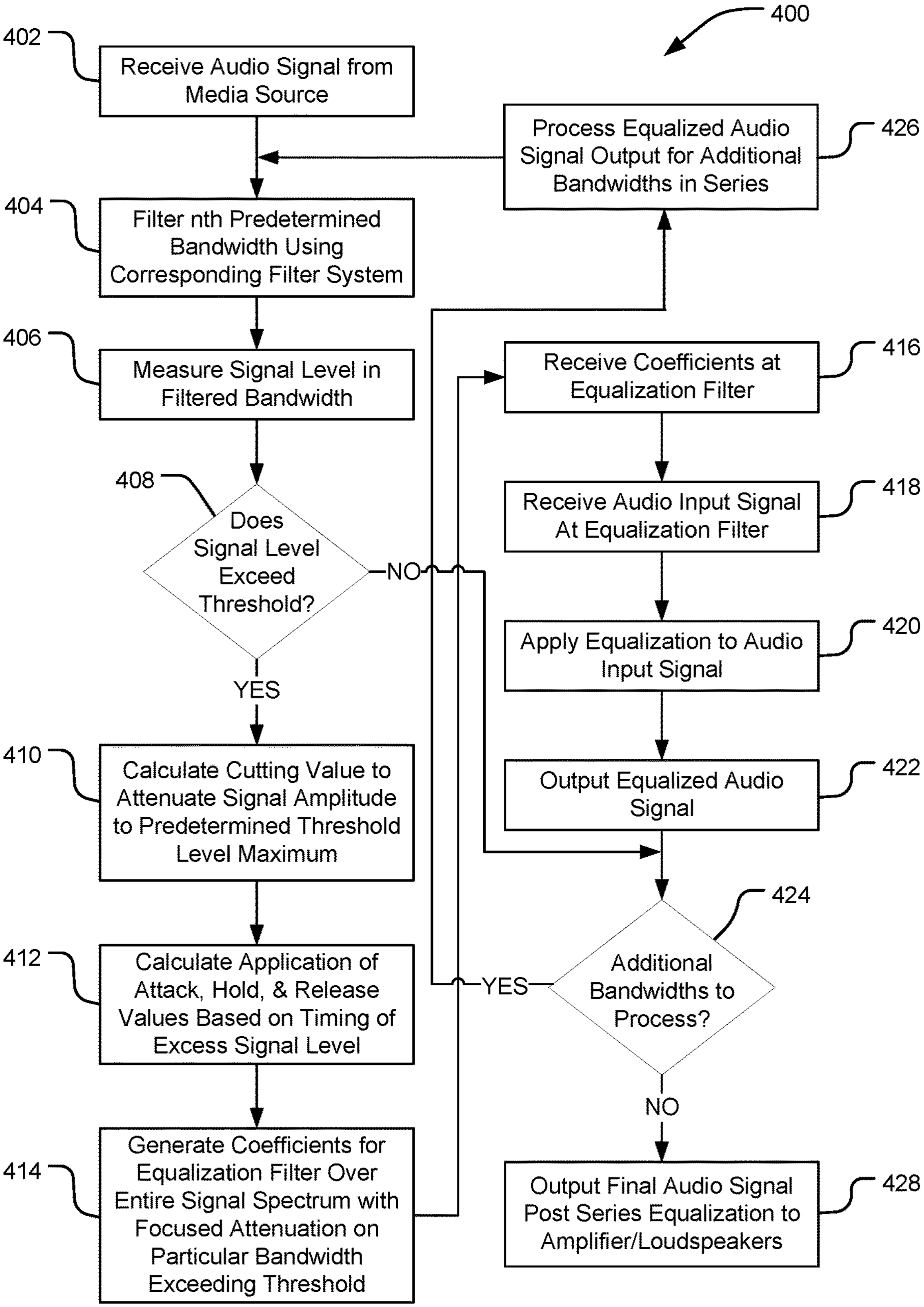
FIG. 4 is a flow diagram of an example equalization process disclosed herein for limitation of distortion of audio output in one or more audio output devices.

In implementations of the disclosed technology, the diagnostics of frequencies caused by or causing distortion in the audio output device for a particular device, and the corresponding threshold signal levels, as determined by the sound engineer, are used as the basis of a hard-coded signal equalization method to minimize or avoid distortion in the sound output. In one embodiment, the method harnesses the processing resources of the device housing the audio output devices (e.g., laptop computer, tablet, smartphone, Bluetooth speaker, etc.) to filter the audio signal and modify signal levels of problem frequencies before outputting the audio signal to the amplifier and audio output devices. FIG. 3 depicts an embodiment of an equalization filter system 300 as disclosed herein conceptually as a series of operational modules that act on the input signal, while FIG. 4 depicts a flow diagram 400 of steps performed in an equalization process implemented by the operational modules of the system 300.

An audio input signal 302 is received in the system of FIG. 3 where it splits into two channels. A first (side) channel passes the input signal through a selection filter 304 (e.g., a bandpass filter) centered on the frequency of concern identified by the sound engineer and of adequate bandwidth to include adjacent frequencies that may suffer from distortion due to signal bleed. The output of the selection filter 304 (e.g., the isolated band of the input signal) proceeds to a level detector 306, where the "loudness" of the signal is determined. The signal level is converted to a decibel value (a "metering value") to represent the amplitude or magnitude of the signal level in the isolated band. The metering value is passed to an amplitude calculator 308 that compares the metering value to a stored threshold signal level value for the selected frequency to determine whether to attenuate the input signal and, if so, by how much. If the metering value exceeds the threshold level, the difference (a "cutting value") between these signal levels is calculated to determine how much to limit the selected bandwidth to avoid distortion. The cutting value may be understood as an amount of gain reduction for attenuation of the amplitude of the input signal. For a given frequency or bandwidth, any energy past a certain point/threshold being transmitted to drive the speakers results in more distortion. The cutting value limits the amount of energy transmitted to avoid crossing the threshold for the frequency/bandwidth by very much, for very long, and only infrequently if at all.

The data output from the amplitude calculator 308 is fed into an attack/hold/release calculator 310. "Attack," "hold," and "release" are parameters often used in audio compressors, gates, expanders, and limiters. In the present context, attack sets the time it takes for the equalization to be applied, e.g., anywhere from instantaneously to many milliseconds after the signal level exceeds the threshold. This allows for a determination of whether the signal level is sustained for the frequency or whether it is an instantaneous aberration that may not cause noticeable distortion. In the latter case, application of an equalization filter might be more audibly noticeable than the aberration and a longer attack time would prevent unnecessary application of the filter. Hold indicates a length of time to continue the application of equalization after the signal level has fallen below the threshold. Release is a setting indicating a length of time application of the equalization filter should trail at decreasing levels to avoid abrupt level changes and smooth the application of the filter.

In one example, attack, release can hold control may be implemented as follows. Attack may be applied when the target limit (i.e., the cutting value) is less than or equal to the current signal gain amount. For each time sample this state is true, the hold counter may be reset (indicating that the hold time has not yet been met). If the limit target is greater than the current signal gain, the current gain may remain at the same value last set until the hold counter expires. Since we reset the hold counter value is reset each time the signal gain exceeds the cutting value, it is conceivable that the system could alternate between attacking and holding the cutting value indefinitely. If the hold value expires (i.e., sufficient sample counts (e.g., the last N samples, where N is the hold value) in which the cutting value is greater than the current gain have occurred), then a release cycle will initiate. The release circuit may feather the gain value back to a target limit value over time. Note, the target limit (cutting value) is variable; it may be the same as the prior cutting value or it may be a new limit of a different (e.g., higher or lower) value. In this example implementation, the system either feathers towards a larger cutting value, holds the current cutting value for some period of time, or feathers towards a smaller cutting value. Many different methods for feathering can be used in many different ways with different types of curves, lines, timing, or change of rate speed limits to achieve desired effects.

Figure 5:
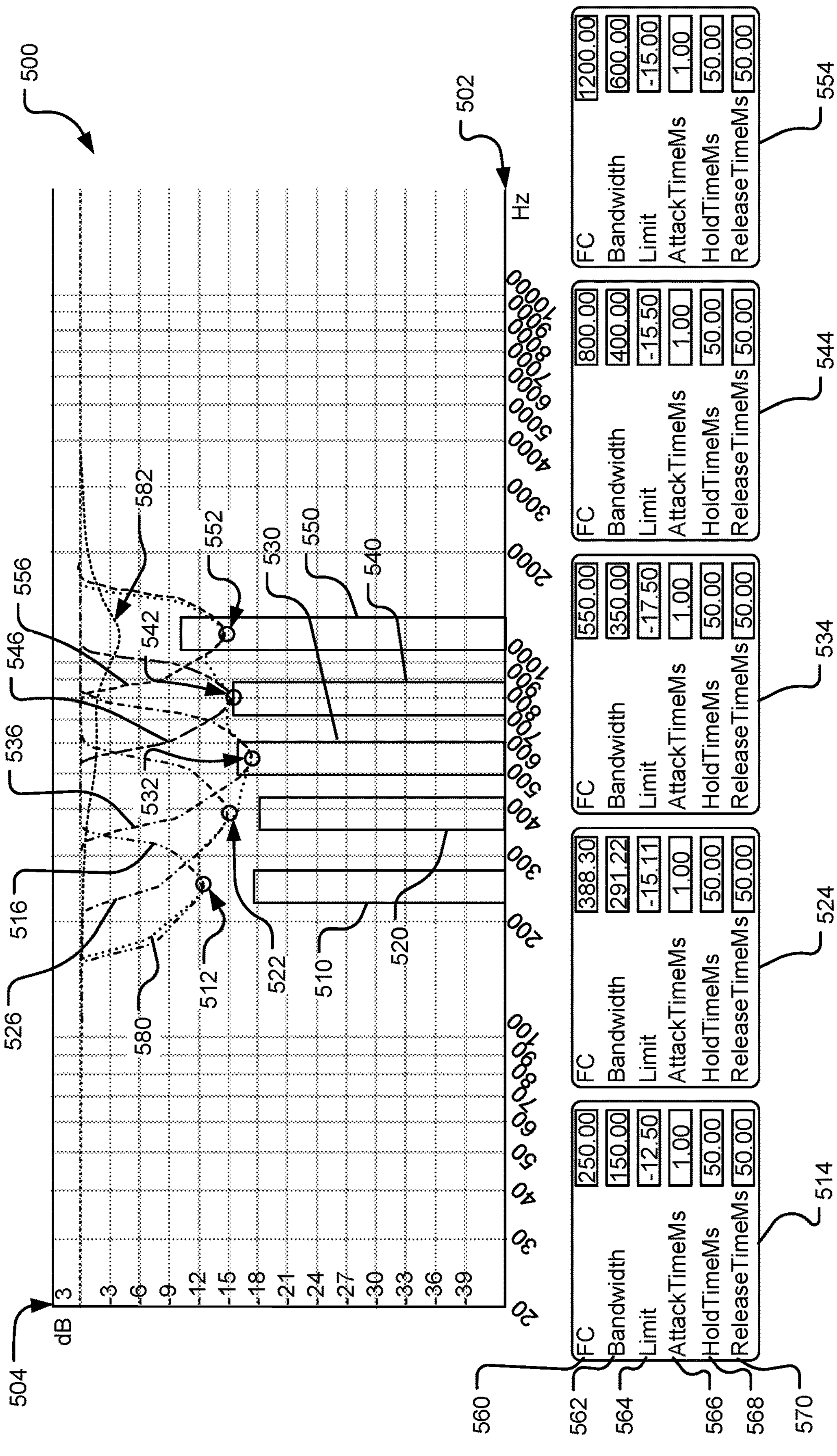
FIG. 5 depicts a screen representation of five frequency bandwidths identified as causing distortion in a particular example of an audio output device design and the effect of an equalizing filter on several of the frequency bands in which signal strength has exceeded a threshold level.
Figure 6:
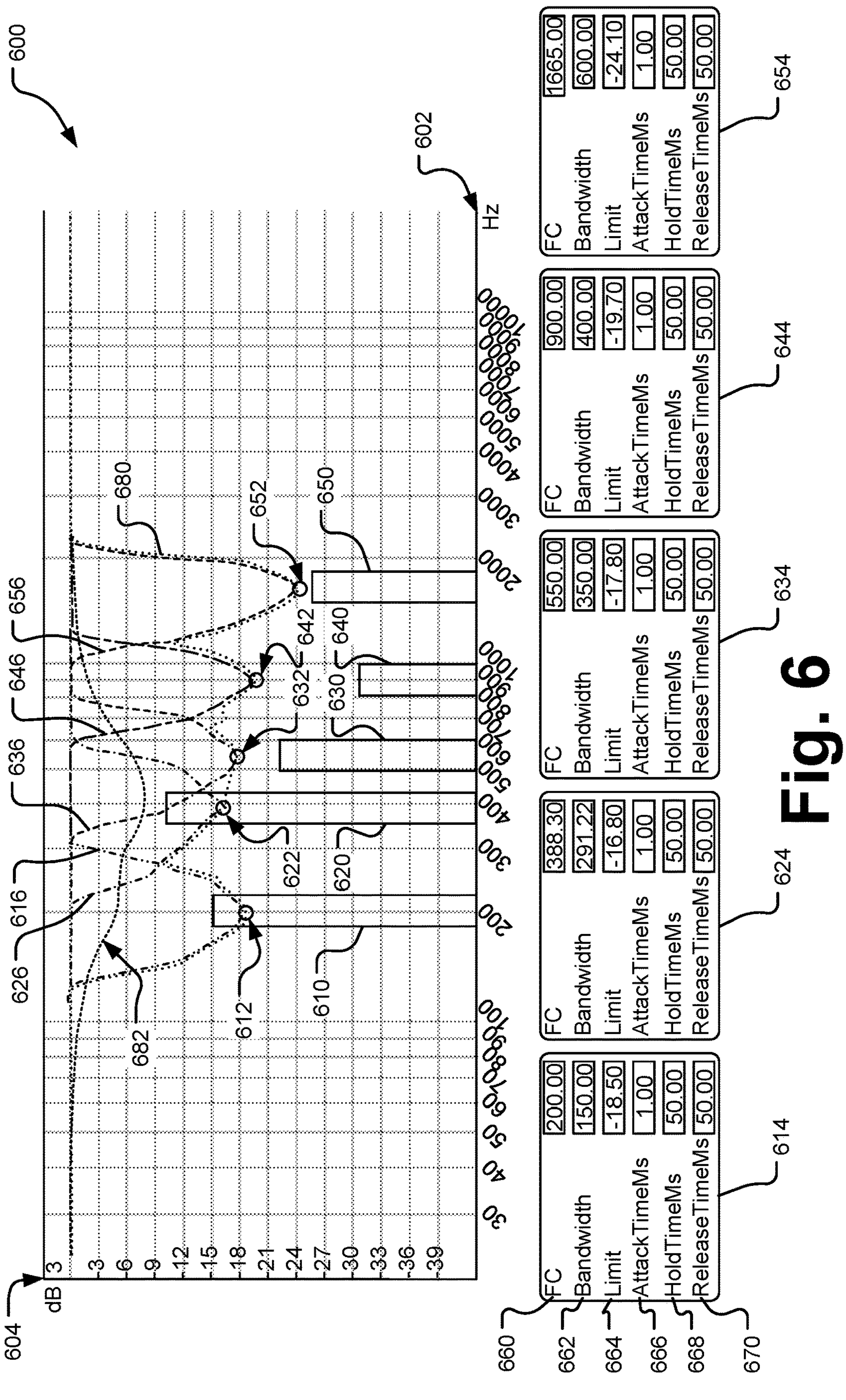
FIG. 6 depicts a screen representation of the five frequency bandwidths of FIG. 5 and the effect of an example equalizing filter on different ones of the frequency bands in which signal strength has exceeded a threshold level.

These settings are static and are set by the sound engineer during the bench analysis before commercial product manufacture and release. They are determined by subjective evaluation of the engineer as levels that best result in distortion reduction without jarring or choppy breaks in the sound level of the acoustic output. The control that is provided to the tuning engineer may vary based upon design choice, e.g., to optimize for transparency to the tuning engineer or to optimize for standard usages. Example attack, hold, and release values for the selected frequency bandwidth equalization are shown in FIGS. 5 and 6 (566, 568, 570, 666, 668, 670) and are discussed further with respect thereto. The attack/hold/release calculator 306 thus manages numerous counters to determine the elapsed time for attack, hold, and release, respectively, in order to inform the calculation of equalization parameters.

In one implementation, a coefficient calculator 312 may receive the variable cutting value output from the attack/hold/release calculator 310. The cutting value, and the bandwidth, sample rate, and center frequency values set by the sound engineer at the time of initial tuning, are used as inputs to the coefficient calculator 312 to compute new coefficients for an appropriate equalization filter 314. The equalization filter 314 may be a recursive infinite impulse response (IIR) filter providing parametric signal equalization. An IIR filter is recursive (e.g., it is designed with a feedback loop). Therefore, input coefficients are additionally calculated with consideration of the prior calculated coefficients. In one embodiment, the equalization filter is a 6th order biquad IIR filter, and the coefficient calculator is programmed to provide the necessary coefficients for such a filter calculation. The newly computed filter coefficients are then passed to the equalization filter 314.

As shown in FIG. 3, the original audio input signal 302 also travels on the second (main) channel and is processed through the equalization filter 314 using the updated filter equation coefficients. As previously described, the equalization filter 314 operates on the entirety of the audio input signal 302 (e.g., across the entire bandwidth) and not merely the frequency band separated by the bandpass filter 304. As indicated above, in one implementation, a biquad filter may be used to create a parametric equalization form. For example, a 6th order biquad filter has 5 coefficients and maintains a recursive history. Even though applied to the entire audio signal spectrum, its output is largely V-shaped, with the center of the V over the problem frequency band, while the remainder of the curve is substantially flat across the frequencies on each side of the V. This is the typical form of a parametric equalizer on an audio signal. Therefore, it beneficially suppresses only part of the entire signal in the desired range. The equalization filter 314 renders an audio output signal 316.

As discussed above, the equalization process is performed in series for each problem frequency identified. Thus, the signal output from a first filtering operation to address a first problem frequency becomes the signal input for a second filtering operation to address a second problem frequency. Depending upon the concerns identified by the sound engineer, there may be only one filtering operation necessary at a single frequency for a particular audio output device design, or there could be several filtering operations required to address multiple problem frequencies identified with respect to an audio output device design. Performing the filtering operation in series for the chosen set of one or more frequencies prone to distortion seeks to avoid unnecessary dampening of frequencies that are not subject to distortion due to the audio output device design. The order of filtering operations in the series may also be determined by the sound engineer to achieve the best signal output for the particular audio output device design or configuration. The sound engineer can thus target problem frequencies in an order of importance to sound quality. In one exemplary embodiment, the order of filtering operations may start with the frequency most prone to distortion or with the largest noticeable effect on the sound output heard by the user and proceed to following frequencies in order of distortion effect from greatest to least.

As noted, if the sound engineer has identified multiple problem frequencies, this filtering operation is performed in series for multiple bandwidths centered on each problem frequency. (See FIGS. 5 and 6 and related descriptions.) Thus, as depicted in FIG. 3, for example, the output signal 316 of the first filter system 300 becomes an input signal for a second filter system 320 of similar design to the first filter system. The difference between the second filter system 320 and the first filter system 300 is the bandwidth selected by the bandpass filter of the second filter system 320, the threshold level, and the attack/hold/release values, all set by the sound engineer. The output signal 316 passes through the second filter system 320 in the same manner as described above with respect to the first filter system 300, and a new audio output signal 322 is generated, potentially as an input to another filter system. If additional filter systems are needed to provide equalization at additional frequencies prone to distortion as determined by the sound engineer, audio output signals from each n additional filter system 324 are used as inputs to the next filter system in series until the nth filter system established by the sound engineer filters the audio signal. The final audio output signal 326 from the nth filter system 324 is then transmitted to the amplifier and audio output device 328 for distortion-free acoustic rendering.

The new equalization filter scheme disclosed herein and thus described as a system with respect to FIG. 3 may also be understood as a process 400 in conjunction with the flow diagram of FIG. 4. As above, an audio input signal is received from a media source (e.g., MP3 playback, streaming audio or video, etc.) as indicated in operation 402. The audio input signal is processed through a bandpass filter of the corresponding frequency filter system to isolate one of the predetermined problem frequencies in the audio input signal as indicated in operation 404. Next, the signal level of the passed bandwidth is measured as indicated in operation 406. As described above, the signal level may be determined in decibels by a level detector and compared to a threshold signal level (operation 408) above which it has been determined that distortion is likely to occur in the acoustic output of the audio output device. If it is determined in operation 408 that the input signal level for the particular frequency does not exceed the threshold level, it may be that no additional filtering is applied at this time, and a determination is made as to whether other frequency bandwidths need to be considered as indicated in operation 424. (Note that, as described above, depending upon attack, hold, and release values, continued filtering may actually occur to gently roll off the applied attenuation to avoid an abrupt, jarring change in sound level.)

If in operation 408 is determined that the input signal level for the frequency band under consideration exceeds the threshold level, the process moves to operation 410 in which a cutting level is determined in the amplitude calculator, which will attenuate the audio signal level to meet the predetermined threshold level in order to avoid distortion in the audio output device. Next, attack, hold, and release calculations are made as indicated in operation 412 depending upon a number of selected factors, e.g., a length of time the signal level has been above or below the threshold level, the current countdown time for each of the preset attack, hold, and release periods, and others as preprogrammed by the sound engineer. The process 400 then takes the cutting value and the attack, hold, and release values to generate coefficients for the chosen equalization filter as indicated in operation 414. As previously described, while the equalization filter will be applied to the entire audio input signal, the coefficients generated in the individual filters in the series are specific to the isolated frequency bandwidth and its corresponding excess signal level.

Once the filter coefficients are generated, they are passed to the equalization filter as indicated in operation 416. Next, the full-spectrum audio input signal is received at the equalization filter as indicated in operation 418. The equalization filter, now updated with new coefficients, then processes the audio input signal and attenuates the audio signal across the entire spectrum according to a curve generated by the chosen filter equation as indicated in operation 420 and produces an output audio signal as indicated in operation 422. The process next determines whether additional problem bandwidths need to be processed as indicated in operation 424. In some embodiments, as the equalization for each problem bandwidth is performed in series, such a determination may not be needed, and the process may flow duplicatively through each filtering system in series as described above with respect to FIG. 3. However, if the implementation is entirely in software, such a logical determination about the need for additional processing loops for different bandwidths using output signals of each in series may be made. The bandwidth, threshold levels, and attack, hold, release values for each processing series would merely be changed for each pass through the loop as conceived in FIG. 4 and as indicated in operation 426.

Again, the equalization process is performed in series for each problem frequency identified. Thus, the signal output from a first filtering operation to address a first problem frequency becomes the signal input for a second filtering operation to address a second problem frequency. Depending upon the concerns identified by the sound engineer, there may be only one filtering operation necessary at a single frequency for a particular audio output device design, or there could be several filtering operations required to address multiple problem frequencies identified with respect to the audio output device design. The order of filtering operations in the series may also be determined by the sound engineer to achieve the best signal output for the particular audio output device design or configuration. In one exemplary embodiment, the order of filtering operations may start with the frequency most prone to distortion or with the largest noticeable effect on the sound output heard by the user and proceed to following frequencies in order of distortion effect from greatest to least. When the final equalization filter corresponding to the final problem frequency bandwidth in the series has been applied, the final audio output signal may be transmitted to the amplifier and audio output devices for distortion-free acoustic output.

Processing the audio signal in series with effective parametric equalization as described is a very efficient approach. All processing remains in the time domain (e.g., there is no transform to the frequency domain to process the signal and attenuate specific frequencies). Frequency domain transforms (e.g., using fast Fourier transforms) are extremely mathematically complex and require significant processing resources, which also causes a power drain on the device battery. Frequency transform solutions also require more time for the processing, so there can be latency in signal output. The parametric equalization process described herein is much faster and more processor efficient, so there is less battery drain and less latency. Further, the sound engineer is able to select specific problem frequencies to center the bandpass filters on, so it is more accurate. Solutions using frequency-domain transforms are limited by the FFT bin number selection of the algorithm, and a problem frequency may fall on the edge of a bin rather than the center. Therefore, even if the bin with the problem frequency is attenuated, bleed into adjacent frequencies in an adjacent bin may not be accounted for, and distortion in the output could still result. While arranging the equalization filters in series as disclosed herein may result in slight over-attenuation at certain frequencies at certain times, the difference in sound level output is generally not noticeable to the user, and excess attenuation will not result in distortion in the acoustic output.

FIG. 5 is a first illustration providing a graphic visualization 500 of an example effect of an equalization filter as described with respect to FIGS. 3 and 4. The graphic visualization 500 depicted may be generated by a software tool used by the audio engineer to select various input parameters for the filters and understand the related effects and to thereby aid in the selection of final parameters for configuration of the output signal for the audio output device included with the manufactured device. In this example, five frequency bands have been identified as susceptible to distortion in the audio output device if the signal level exceeds a threshold. The graph 500 plots frequency (Hz) on the X-axis 502 against signal level (dB) on the Y-axis 504. A first frequency band 510 is centered at about 250 Hz, and the bandwidth of the applied bandpass filter is 150 Hz, which is represented by the width of the first frequency band 510. The height of the first frequency band 510 represents the signal level of the center frequency in the band as captured in the instant represented in the graphic visualization 500. The signal threshold setting 512 at which distortion begins is determined to be −12.5 dB. These values are preset by the audio engineer and are represented in the first input window 514. The input window 514 may allow the audio engineer to enter a number of values for parameters of the equalization filter set for the frequency band 510. As depicted on the graph, the frequency center setting 560 is 250 Hz, the bandwidth setting 562 is 150 Hz, and the threshold signal limit setting 564 is −12.5 dB. In addition, values for an attack time setting 566, a hold time setting 568, and a release time setting 570 for use in the attack/release calculator 310 may also be entered in the input window 514.

A second frequency band 520 is centered at about 388.30 Hz, and the bandwidth of the applied bandpass filter is 291.22 Hz, as indicated in the second input window 524, and which is represented by the width of the second frequency band 520. The height of the second frequency band 520 represents the signal level of the center frequency in the band as captured in the instant represented in the graphic visualization 500. The signal threshold setting 522 is placed at −15.11 dB. These and the other final equalization filter values (attack/hold/release) for the second frequency band 520 preset by the audio engineer are represented in the second input window 524 in the same manner as in the first input window 514.

A third frequency band 530 is centered at about 550 Hz, and the bandwidth of the applied bandpass filter is 350 Hz, as indicated in the third input window 534, and which is represented by the width of the third frequency band 530. The height of the third frequency band 530 represents the signal level of the center frequency in the band as captured in the instant represented in the graphic visualization 500. The signal threshold setting 532 is placed at −17.50 dB. These and the other final equalization filter values (attack/hold/release) for the third frequency band 530 preset by the audio engineer are represented in the third input window 534 in the same manner as in the first input window 514.

A fourth frequency band 540 is centered at about 800 Hz, and the bandwidth of the applied bandpass filter is 400 Hz, as indicated in the fourth input window 544, and which is represented by the width of the fourth frequency band 540. The height of the fourth frequency band 540 represents the signal level of the center frequency in the band as captured in the instant represented in the graphic visualization 500. The signal threshold setting 542 is placed at −15.50 dB. These and the other final equalization filter values (attack/hold/release) for the fourth frequency band 540 preset by the audio engineer are represented in the fourth input window 544 in the same manner as in the first input window 514.

A fifth frequency band 550 is centered at about 1200 Hz, and the bandwidth of the applied bandpass filter is 600 Hz, as indicated in the fifth input window 554, and which is represented by the width of the fifth frequency band 550. The height of the fifth frequency band 550 represents the signal level of the center frequency in the band as captured in the instant represented in the graphic visualization 500. The signal threshold setting 552 is placed at −15.00 dB. These and the other final equalization filter values (attack/hold/release) for the fifth frequency band 550 preset by the audio engineer are represented in the fifth input window 554 in the same manner as in the first input window 514.

The corresponding V-shape equalization curves 516, 526, 536, 546, 556 of the parametric filters for each respective frequency band 510, 520, 530, 540, 550 set by the values 560, 562, 564, 566, 568, 570 in the respective input windows 514, 524, 534, 544, 554 are depicted in the visualization graph 500 of FIG. 5. Equalization curve 580 is a combination of the V-shape equalization curves 516, 526, 536, 546, 556 if all were to be applied simultaneously at full strength. However, as discussed with respect to FIGS. 3 and 4, one of the inputs to the equalization filter 314 determined by the amplitude calculator 308 is a difference in value between the metering value and the threshold value. Usually, the metering value will not be so much greater than the threshold value to trigger the full possible effect of the equalization filter on any or all of the frequency bands 510, 520, 530, 540, 550. Further, as discussed above, the stages of the release/attack/hold coefficients will also attenuate the application of the equalization filter.

This attenuation across the entire audible range is depicted by a suppression curve 582 shown in FIG. 5. As depicted, the signal level of the first frequency band 510 and the second frequency band 520 are well below the respective threshold levels 512, 522 for application of the equalization filter. Therefore, the input signal would not be subject to the equalization filter due to coefficients generated by these bandwidths. (See operation 408 of FIG. 4.) The signal level of the fourth frequency band 540 appears to be equivalent to the threshold level 542. Therefore, the input signal may or may not be subject to the equalization filter, but if the equalization filter is applied to the input signal based on coefficients generated with respect to the fourth frequency band 540, the attenuation would be slight. The signal levels of the third frequency band 530 and fifth frequency band 550 both exceed the respective threshold levels 532, 552. Therefore, the process 400 depicted in FIG. 4 will apply the equalization filter to the input signal based upon the coefficients generated for the third frequency band 530 and the fifth frequency band 550.

As discussed above, the equalization filter will be applied in series to the full spectrum of the input signal. For example, if the sound engineer originally determined that the fifth frequency band 550 was most susceptible to noticeable distortion, the equalization filter configured with respect to the clipping level of the fifth frequency band 550 may be applied to the input signal first, followed sequentially by configurations of the filter with respect to the order of importance of the remaining frequency bands as set by the sound engineer. In this manner, the input signal of the example of FIG. 5 may be processed by configurations of the equalization filter at least twice, i.e., due to the fourth and fifth frequency bands 540, 550 exceeding their respective thresholds.

The first pass of the equalization filter configured by coefficients related to the clipping level determined by the fifth frequency band 550 results in suppression at the location of the fifth frequency band that is more aggressive than across any of the other frequencies. After the input signal is filtered pursuant to the equalization filter generated corresponding to the fifth frequency band 550, the modified input signal is then filtered pursuant to the equalization filter using coefficients generated corresponding to the clipping level for the third frequency band 530. The suppression curve 582 indicates the equalization level applied across the entire audible frequency spectrum of the modified input signal after filtering passes through all five frequency bands are complete for a cycle. Recall that the equalization filter in the example embodiment is infinite and recursive, which means that the signal levels across the spectrum and prior coefficient values are used in the calculation of new coefficients; the prior coefficients are not completely jettisoned as part of the next calculation. Therefore, the coefficients may be viewed as adjusted to create a smooth transition with each filtering pass, and some amount of dampening of the signal level in another frequency band would be expected if that signal level had previously exceeded its threshold.

While the final output signal might be slightly over-damped across certain frequencies, this is a tradeoff for implementing equalization in the time domain and serially applying equalization filters generated for the determined frequency bands of concern. Overall, however, if the signal level of one frequency band significantly exceeds the corresponding threshold value, and the other frequency bands have no or little signal level excess, the effect of the equalization filter focused on the frequency band with the high signal level will not be significantly over-attenuated by the other equalization filters corresponding to other frequency bands. If the signal levels at the other frequency bands do not exceed their respective thresholds, there would be no competing or subsequent effect of another equalization filter on the audio signal.

FIG. 6 is a second illustration providing a graphic visualization 600 of an example effect of an equalization filter as described with respect to FIGS. 3 and 4. The graphic visualization 600 depicted may be generated by a software tool used by the audio engineer to select various input parameters for the filters and understand the related effects and to thereby aid in the selection of final parameters for configuration of the output signal for the audio output device included with the manufactured device. In this example, the five frequency bands identified in FIG. 5 as susceptible to distortion in the audio output device are depicted in a different state and with different signal level threshold settings. The graph 600 plots frequency (Hz) on the X-axis 602 against signal level (dB) on the Y-axis 604. As before, the first frequency band 610 is centered at about 200 Hz, and the bandwidth of the applied bandpass filter is 150 Hz, which is represented by the width of the first frequency band 610. The height of the first frequency band 610 represents the signal level of the center frequency in the band as captured in the instant represented in the graphic visualization 600. The signal threshold setting 612 at which distortion begins is determined to be −18.5 dB. Again, these values are preset by the audio engineer and are represented in the first input window 614. The input window 614 may allow the audio engineer to enter a number of values for parameters of the equalization filter set for the frequency band 610. As depicted on the graph, the frequency center setting 660 is 200 Hz, the bandwidth setting 662 is 150 Hz, and the threshold signal limit setting 664 is −18.5 dB. In addition, values for an attack time setting 666, a hold time setting 668, and a release time setting 670 for use in the attack/release calculator 310 may also be entered in the input window 614.

The second frequency band 620 is centered at about 388.30 Hz, and the bandwidth of the applied bandpass filter is 291.22 Hz, as indicated in the second input window 624, and which is represented by the width of the second frequency band 620. The height of the second frequency band 620 represents the signal level of the center frequency in the band as captured in the instant represented in the graphic visualization 600. The signal threshold setting 622 is placed at −16.8 dB. These and the other final equalization filter values (attack/hold/release) for the second frequency band 620 preset by the audio engineer are represented in the second input window 624 in the same manner as in the first input window 614.

The third frequency band 630 is centered at about 550 Hz, and the bandwidth of the applied bandpass filter is 350 Hz, as indicated in the third input window 634, and which is represented by the width of the third frequency band 630. The height of the third frequency band 630 represents the signal level of the center frequency in the band as captured in the instant represented in the graphic visualization 600. The signal threshold setting 632 is placed at −17.80 dB. These and the other final equalization filter values (attack/hold/release) for the third frequency band 630 preset by the audio engineer are represented in the third input window 634 in the same manner as in the first input window 614.

The fourth frequency band 640 is centered at about 900 Hz, and the bandwidth of the applied bandpass filter is 400 Hz, as indicated in the fourth input window 644, and which is represented by the width of the fourth frequency band 640. The height of the fourth frequency band 640 represents the signal level of the center frequency in the band as captured in the instant represented in the graphic visualization 600. The signal threshold setting 642 is placed at −19.70 dB. These and the other final equalization filter values (attack/hold/release) for the fourth frequency band 640 preset by the audio engineer are represented in the fourth input window 644 in the same manner as in the first input window 614.

The fifth frequency band 650 is centered at about 1665 Hz, and the bandwidth of the applied bandpass filter is 600 Hz, as indicated in the fifth input window 654, and which is represented by the width of the fifth frequency band 650. The height of the fifth frequency band 650 represents the signal level of the center frequency in the band as captured in the instant represented in the graphic visualization 600. The signal threshold setting 652 is placed at −24.10 dB. These and the other final equalization filter values (attack/hold/release) for the fifth frequency band 650 preset by the audio engineer are represented in the fifth input window 654 in the same manner as in the first input window 614.

The corresponding V-shape equalization curves 616, 626, 636, 646, 656 of the parametric filters for each respective frequency band 610, 620, 630, 640, 650 set by the values 660, 662, 664, 666, 668, 670 in the respective input windows 614, 624, 634, 644, 654 are depicted in the visualization graph 600 of FIG. 6. Equalization curve 680 is a combination of the V-shape equalization curves 616, 626, 636, 646, 656 if all were to be applied simultaneously at full strength. However, as discussed with respect to FIGS. 3 and 4, one of the inputs to the equalization filter 314 determined by the amplitude calculator 308 is a difference in value between the metering value and the threshold value. Usually, the metering value will not be so much greater than the threshold value to trigger the full possible effect of the equalization filter on any or all of the frequency bands 610, 620, 630, 640, 650. Further, as discussed above, the stages of the release/attack/hold coefficients will also attenuate the application of the equalization filter.

This attenuation across the entire audible range is depicted by the suppression curve 682 shown in FIG. 6. As depicted, the signal level of the first frequency band 610 and the second frequency band 620 are well beyond the respective threshold levels 612, 622 for application of the equalization filter. Therefore, the process 400 depicted in FIG. 4 will apply the equalization filter to the input signal based upon the coefficients generated for the first frequency band 610 and the second frequency band 620. The signal levels of the third frequency band 630, the fourth frequency band 640, and the fifth frequency band 650 do not exceed the respective threshold levels 632, 642, and 652. Therefore, the input signal would not be subject to the equalization filter due to coefficients generated by these bandwidths. (See operation 408 of FIG. 4.)

As discussed above, the equalization filter will be applied in series to the full spectrum of the input signal. For example, if the sound engineer originally determined that the second frequency band 620 was most susceptible to noticeable distortion, the equalization filter configured with respect to the clipping level of the second frequency band 620 may be applied to the input signal first, followed sequentially by configurations of the filter with respect to the order of importance of the remaining frequency bands as set by the sound engineer. In this manner, the input signal of the example of FIG. 6 may be processed by configurations of the equalization filter at least twice corresponding to the excess signal levels in the first frequency band 610 and the second frequency band 620, i.e., due to the first and second frequency bands 610, 620 exceeding their respective thresholds.

The first pass of the equalization filter configured by coefficients related to the clipping level determined by the second frequency band 620 results in suppression at the location of the second frequency band 620 that is more aggressive than across any of the other frequencies. After the input signal is filtered pursuant to the equalization filter generated corresponding to the second frequency band 620, the modified input signal is then filtered pursuant to the equalization filter using coefficients generated corresponding to the clipping level for the first frequency band 610. The suppression curve 682 indicates the equalization level applied across the entire audible frequency spectrum of the modified input signal after filtering passes through all five frequency bands are complete for a cycle. Recall that the equalization filter in the example embodiment is infinite and recursive, which means that the signal levels across the spectrum and prior coefficient values are used in the calculation of new coefficients; the prior coefficients are not completely jettisoned as part of the next calculation. Therefore, the coefficients may be viewed as "adjusted" to create a smooth transition with each filtering pass, and dampening of the signal level in the first frequency band 610 would be expected if that signal level had previously exceeded its threshold.

While the final output signal might be slightly overdamped across certain frequencies, this is a tradeoff for implementing equalization in the time domain and serially applying equalization filters generated for the determined frequency bands of concern. Overall, however, if the signal level of one frequency band significantly exceeds the corresponding threshold value, and the other frequency bands have no or little signal level excess, the effect of the equalization filter focused on the frequency band with the high signal level will not be significantly over-attenuated by the other equalization filters corresponding to other frequency bands. If the signal levels at the other frequency bands do not exceed their respective thresholds, there would be no competing or subsequent attenuating effect of another equalization filter on the audio signal.

Figure 7:
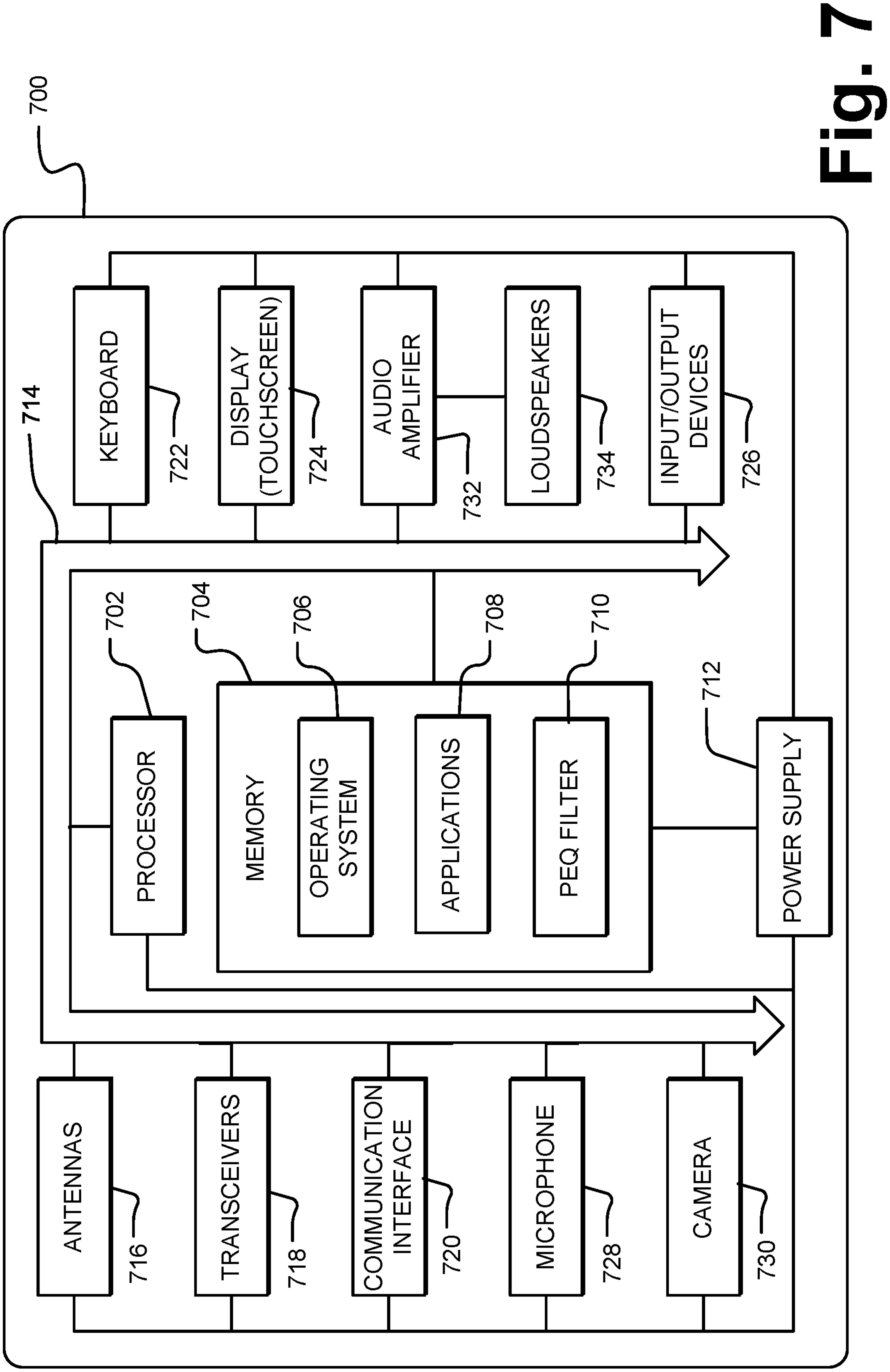
FIG. 7 is a schematic diagram of an example computing device for implementation of the equalization filter processes disclosed herein.

An exemplary computing device 700 (e.g., a desktop computer, a laptop computer, a tablet computer, a mobile smartphone device, etc.) with audio output devices, e.g., loudspeakers 734 that may implement embodiments of the distortion limiting equalizing filter process disclosed herein is depicted in FIG. 7. The computing device 700 includes a processor 702 and memory 704 as in any standard computing device. The processor 702, memory 704, and other components hereinafter described may interface via a system bus 714. The system bus 714 may be any of several types of bus structures including a memory bus or memory controller, a peripheral bus, a switched fabric, point-to-point connections, and a local bus. The memory 704 generally includes both volatile memory (e.g., RAM) and nonvolatile memory (e.g., flash memory or a magnetic disk drive). An operating system 706 may reside in the memory 704 and execute on the processor 702. An exemplary operating system may be the Microsoft Windows® operating system from Microsoft Corporation. In other embodiments, the distortion limiting equalizing filter process disclosed herein may be implemented as a system on a chip (SoC) (e.g., a digital signal processor (DSP), an ARM microcontroller, etc.) within any operating system. It is also possible to execute these processes on field programmable gate array (FPGA) hardware.

One or more application programs 706 or program modules may be saved into the memory 704 for execution by the processor 702 in conjunction with the operating system 706. In particular, the memory 704 may include instructions for executing a distortion limiting equalizing filter 710 on the processor 702. The equalizing filter 710 equalizes audio signal input before output to an audio amplifier 732 connected to the loudspeakers 734 to reduce the likelihood of distortion in the loudspeakers 734 at certain frequencies.

The computing device 700 also has a power supply 712, which may be implemented using one or more batteries. The power supply 712 may also be from an external AC source through the use of a power cord or a powered data transfer cable connected with the computing device 700 that overrides or recharges the batteries. The power supply 712 is connected to most, if not all, of the components of the computing device 700 in order for each of the components to operate.

The computing device 700 may connect with numerous communication networks, for example, a wireless LAN (WiFi) network, a wired LAN or WAN, GPRS, Bluetooth, UMTS, or any other network via one or more communication interfaces 720. The antenna 716 or multiple antennae may be used for different communication purposes, for example, radio frequency identification (RFID), microwave transmissions and receptions, WiFi transmissions and receptions, and Bluetooth transmissions and receptions. In one embodiment, the computing device 700 may be a mobile smartphone and include wireless telephony communications capabilities. The computing device 700 with telephone capabilities generally includes an antenna 716 and a transceiver 718 for interfacing with a wireless telephony network.

The computing device 700 may include a microphone(s) 728 and a camera (e.g., a video camera) 730 that, in conjunction with the loudspeaker 734 driven by the audio amplifier 732, allows a user to communicate across a network using the computing device 700. The loudspeaker 734 may also be in the form of a wired or wireless output port for connection with a wired or wireless earphone or headphone. The computing device 700 may further include other types of user interfaces. As shown in FIG. 7, the computing device 700 may have a keyboard 722 and a video display 724. The keyboard 722 may be a limited numeric pad, a full "qwerty" keyboard, or a combination of both. The keyboard 722 may also include specialty buttons, touchpads, wheels, trackballs, and other interface options, for example, menu selection or navigation keys or telephone function keys. In addition to depicting information, the display 724 may also be a touch screen display that allows for data entry by touching the display screen with the user's finger or a stylus to make input selections via a graphical interface or write letters and numbers directly on the display 724. The computing device may also include connections for external input/output devices 726, for example, a computer mouse, a trackpad, a printer, one or more video monitors, etc.

The computing device 700 may include a variety of tangible computer-readable storage media comprising the memory 704 and intangible computer-readable communication signals. Tangible computer-readable storage can be embodied by any available media that can be accessed by the computing device 700 and includes both volatile and nonvolatile storage media, removable and non-removable storage media. Tangible computer-readable storage media excludes intangible and transitory communications signals (e.g., signals per se) and includes volatile and nonvolatile, removable and non-removable storage media implemented in any method or technology for storage of information such as computer-readable instructions, data structures, program modules, or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, other magnetic storage devices, or any other tangible medium that can be used to store the desired information, and which can be accessed by the processing device 702. In contrast to tangible computer-readable storage media, intangible computer-readable communication signals may embody computer-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared, and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

An example method disclosed herein provides for limiting distortion in an audio output device in the following manner. A first bandpass filter is applied to an audio signal for a first defined frequency range known to cause distortion in the audio output device. Then a signal level of the audio signal within the first defined frequency range is measured. For the first defined frequency range, a difference between the measured signal level and a threshold level is computed. Filter coefficients based, at least in part, on the computed difference are generated. Then the audio signal is filtered using the generated filter coefficients applied to limit the signal level of the audio signal to reduce distortion in audible output of the audio output device.

In an example method, in addition to the preceding method, attack, hold, and release time values may be calculated based, at least in part, upon preset time inputs. Further, the generating operation, the filter coefficients may be generated based, at least in part, on the calculated attack, hold, and release time values.

In another example method, in addition to any of the preceding methods, whether the signal level is increasing or decreasing and a period of time of increase or decrease, respectively, may be determined. Further, the computing operation may determine a cutting value by adjusting the computed difference based, at least in part, upon the period of time of increase or decrease. The generating operation may be based, at least in part, on the cutting value rather than the computed difference.

In another example method, in addition to any of the preceding methods, the filtering operation may be performed by a recursive infinite impulse response (IIR) filter with a parametric output curve centered on the defined frequency range.

In another example method, in addition to any of the preceding methods, the filtering operation may be performed within a time domain.

In another example method, in addition to any of the preceding methods, the operations of applying, measuring, computing, generating, and filtering may together comprise a distinct bandwidth process. The distinct bandwidth process may be performed multiple times in series for a respective plurality of defined frequency ranges. An input audio signal for each performance of the distinct bandwidth process may include an output audio signal of an immediately prior distinct bandwidth process. A separate threshold level may be defined for each distinct bandwidth process corresponding to a respective defined frequency range.

In another example method, in addition to any of the preceding methods, applying a second bandpass filter for a second defined frequency range known to cause distortion in the audio output device may be applied to the filtered audio signal. A signal level of the filtered audio signal may be measured within the second defined frequency range. A second difference between the measured signal level and the threshold level of the filtered audio signal may be computed for the second defined frequency range. Second filter coefficients based, at least in part, on the computed second difference may be generated. The filtered audio signal may then be filtered using the generated second filter coefficients applied to further limit a second signal level of the audio signal to reduce distortion in audible output of the audio output device.

An example system disclosed herein for limiting distortion in an audio output device may include one or more hardware computing processors and memory storage device. The memory storage device may be configured with instructions for directing the one or more hardware computing processors to perform the following functions: apply, to an audio signal of the audio output device, a first bandpass filter for a first defined frequency range known to cause distortion in the audio output device; measure a signal level of the audio signal within the first defined frequency range; compute, for the first defined frequency range, a difference between the measured signal level and a threshold level; generate filter coefficients based, at least in part, on the computed difference; and filter the audio signal using the generated filter coefficients applied to limit the signal level of the audio signal to reduce distortion in audible output of the audio output device.

In another example system, in addition to the preceding system, instructions may be provided for directing the one or more hardware computing processors to calculate attack, hold, and release time values based, at least in part, upon preset time inputs, wherein the filter coefficients are further generated based, at least in part, on the calculated attack, hold, and release time values.

In another example system, in addition to any of the preceding systems, instructions may be provided for directing the one or more hardware computing processors to determine whether the signal level is increasing or decreasing and a period of time of increase or decrease, respectively; determine a cutting value by adjusting the computed difference based, at least in part, upon the period of time of increase or decrease; and generate filter coefficients based, at least in part, on the cutting value rather than the computed difference.

In another example system, in addition to any of the preceding systems, the one or more hardware computing processors may be configured to filter the audio signal using a recursive infinite impulse response (IIR) filter with a parametric output curve centered on the defined frequency range.

In another example system, in addition to any of the preceding systems, the one or more hardware computing processors may be configured to filter the audio signal in a time domain.

In another example system, in addition to any of the preceding systems, the instructions to the one or more hardware computing processors to apply, measure, compute, generate, and filter together comprise a distinct bandwidth process. The processor may be further directed to perform the distinct bandwidth process multiple times in series for a respective plurality of defined frequency ranges, wherein an input audio signal for each performance of the distinct bandwidth process comprises an output audio signal of an immediately prior distinct bandwidth process, and a separate threshold level is defined for each distinct bandwidth process corresponding to a respective defined frequency range.

In another example system, in addition to any of the preceding systems, instructions may be provided for directing the processor to apply a second bandpass filter for a second defined frequency range known to cause distortion in the audio output device to the filtered audio signal; measure a signal level of the filtered audio signal within the second defined frequency range; compute, for the second defined frequency range, a second difference between the measured signal level and the threshold level of the filtered audio signal; generate second filter coefficients based, at least in part, on the computed second difference; and filter the filtered audio signal using the generated second filter coefficients applied to further limit a second signal level of the audio signal to reduce distortion in audible output of the audio output device.

An example of one or more tangible processor-readable storage media embodied with instructions for executing on one or more processors and circuits of a computing device a process for performing a computer process to limit distortion in an audio output device may include the following process operations. A first bandpass filter may be applied to an audio signal of the audio output device for a first defined frequency range known to cause distortion in the audio output device. A signal level of the audio signal within the first defined frequency range may be measured. A difference between the measured signal level and a threshold level may be computed for the first defined frequency range. Filter coefficients may be generated based, at least in part, on the computed difference. The audio signal may then be filtered using the generated filter coefficients applied to limit the signal level of the audio signal to reduce distortion in audible output of the audio output device.

In another example configuration of one or more tangible processor-readable storage media, in addition to the preceding media, the process operations may further include calculating attack, hold, and release time values based, at least in part, upon preset time inputs, wherein the operation of generating filter coefficients further comprises generating the filter coefficients based, at least in part, on the calculated attack, hold, and release time values.

In another example configuration of one or more tangible processor-readable storage media, in addition to any of the preceding media, the process may further include determining whether the signal level is increasing or decreasing and a period of time of increase or decrease, respectively. The operation of computing the difference may further include determining a cutting value by adjusting the computed difference based, at least in part, upon the period of time of increase or decrease and the generating operation is based, at least in part, on the cutting value rather than the computed difference.

In another example configuration of one or more tangible processor-readable storage media, in addition to any of the preceding media, the filtering operation may be performed by a recursive infinite impulse response (IIR) filter with a parametric output curve centered on the defined frequency range.

In another example configuration of one or more tangible processor-readable storage media, in addition to any of the preceding media, the operations of applying, measuring, computing, generating, and filtering together comprise a distinct bandwidth process. The operation for performing the computer process may implement the performance of the distinct bandwidth process multiple times in series for a plurality of defined frequency ranges, wherein an input audio signal for each performance of the distinct bandwidth process comprises an output audio signal of an immediately prior distinct bandwidth process, and a separate threshold level is defined for each distinct bandwidth process corresponding to a respective defined frequency range.

In another example configuration of one or more tangible processor-readable storage media, in addition to any of the preceding media, the process operations may further include applying, to an audio signal of the audio output device, a second bandpass filter for a second defined frequency range known to cause distortion in the audio output device to the filtered audio signal; measuring a signal level of the filtered audio signal within the second defined frequency range; computing, for the second defined frequency range, a second difference between the measured signal level and the threshold level of the filtered audio signal; generating second filter coefficients based, at least in part, on the computed second difference; and filtering the filtered audio signal using the generated second filter coefficients applied to further limit a second signal level of the audio signal to reduce distortion in audible output of the audio output device.

Another example system disclosed herein provides for limiting distortion in an audio output device includes the following components: a means for applying a first bandpass filter to an audio signal for a first defined frequency range known to cause distortion in the audio output device, a means for measuring a signal level of the audio signal within the first defined frequency range, a means for computing for the first defined frequency range, a difference between the measured signal level and a threshold level, a means for generating filter coefficients based, at least in part, on the computed difference, and a means for filtering the audio signal using the generated filter coefficients applied to limit the signal level of the audio signal to reduce distortion in audible output of the audio output device.

The above specification, examples, and data provide a complete description of the structure and use of exemplary embodiments of the invention. Although various embodiments of the invention have been described above with a certain degree of particularity or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method of limiting distortion in an audio output device, the method comprising:

applying, to an audio signal, a first bandpass filter for a first defined frequency range known to cause distortion in the audio output device;

measuring a signal level of the audio signal filtered using the first bandpass filter within the first defined frequency range;

computing, for the first defined frequency range, a difference between the measured signal level and a threshold level;

generating filter coefficients based, at least in part, on the computed difference; and filtering the audio signal using the generated filter coefficients applied to limit the signal level of the audio signal and reduce distortion in audible output of the audio output device.

2. The method of claim 1, further comprising calculating attack, hold, and release time values based, at least in part, upon preset time inputs, the generating operation further comprising generating the filter coefficients based at least in part on the calculated attack, hold, and release time values.

3. The method of claim 1, further comprising:

determining whether the signal level is increasing or decreasing and a period of time of increase or decrease, respectively, wherein the computing operation further comprises determining a cutting value by adjusting the computed difference based, at least in part, upon the period of time of increase or decrease, and wherein generating the filter coefficients is based, at least in part, on the cutting value.

4. The method of claim 1, wherein the filtering operation is performed by a recursive infinite impulse response (IIR) filter with a parametric output curve centered on the defined frequency range.

5. The method of claim 1, wherein the filtering operation is performed within a time domain.

6. The method of claim 1, wherein the operations of applying, measuring, computing, generating, and filtering together comprise a distinct bandwidth process, the distinct bandwidth process is performed multiple times in series for a respective plurality of defined frequency ranges, an input audio signal for each performance of the distinct bandwidth process comprises an output audio signal of an immediately prior distinct bandwidth process, and a separate threshold level is defined for each distinct bandwidth process corresponding to a respective defined frequency range.

7. The method of claim 1, further comprising:

applying a second bandpass filter for a second defined frequency range known to cause distortion in the audio output device to the filtered audio signal;

measuring a signal level of the audio signal filtered using the second bandpass filter within the second defined frequency range;

computing, for the second defined frequency range, a second difference between the measured signal level and the threshold level of the filtered audio signal;

generating second filter coefficients based, at least in part, on the computed second difference; and further filtering the filtered audio signal that was filtered using the generated filter coefficients, using the generated second filter coefficients applied to further limit a second signal level of the audio signal to reduce distortion in audible output of the audio output device.

8. A system for limiting distortion in an audio output device, the system comprising:

one or more hardware computing processors;

a memory storage device configured with instructions for directing the one or more hardware computing processors to:

apply, to an audio signal of the audio output device, a first bandpass filter for a first defined frequency range known to cause distortion in the audio output device, measure a signal level of the audio signal filtered using the first bandpass filter within the first defined frequency range, compute, for the first defined frequency range, a difference between the measured signal level and a threshold level, generate filter coefficients based, at least in part, on the computed difference, and filter the audio signal using the generated filter coefficients applied to limit the signal level of the audio signal and reduce distortion in audible output of the audio output device.

9. The system of claim 8, further comprising instructions for directing the one or more hardware computing processors to calculate attack, hold, and release time values based, at least in part, upon preset time inputs, wherein the filter coefficients are further generated based, at least in part, on the calculated attack, hold, and release time values.

10. The system of claim 8, further comprising instructions for directing the one or more hardware computing processors to determine whether the signal level is increasing or decreasing and a period of time of increase or decrease, respectively; and determine a cutting value by adjusting the computed difference based, at least in part, upon the period of time of increase or decrease, wherein generating the filter coefficients is based, at least in part, on the cutting value.

11. The system of claim 8, wherein the one or more hardware computing processors are configured to filter the audio signal using a recursive infinite impulse response (IIR) filter with a parametric output curve centered on the defined frequency range.

12. The system of claim 8, wherein the one or more hardware computing processors are configured to filter the audio signal in a time domain.

13. The system of claim 8, wherein the instructions to the one or more hardware computing processors to apply, measure, compute, generate, and filter together comprise a distinct bandwidth process, and the processor is further directed to perform the distinct bandwidth process multiple times in series for a respective plurality of defined frequency ranges, wherein an input audio signal for each performance of the distinct bandwidth process comprises an output audio signal of an immediately prior distinct bandwidth process, and a separate threshold level is defined for each distinct bandwidth process corresponding to a respective defined frequency range.

14. The system of claim 8 further comprising instructions for directing the processor to apply a second bandpass filter for a second defined frequency range known to cause distortion in the audio output device to the filtered audio signal;

measure a signal level of the audio signal filtered using the second bandpass filter within the second defined frequency range;

compute, for the second defined frequency range, a second difference between the measured signal level and the threshold level of the filtered audio signal;

generate second filter coefficients based, at least in part, on the computed second difference; and filter the audio signal filtered using the filter coefficients using the generated second filter coefficients applied to further limit a second signal level of the audio signal to reduce distortion in audible output of the audio output device.

15. One or more tangible computer-readable storage media embodied with instructions for executing on one or more processors and circuits of a computing device a process for performing a computer process to limit distortion in an audio output device, the process comprising:

applying, to an audio signal of the audio output device, a first bandpass filter for a first defined frequency range known to cause distortion in the audio output device;

measuring a signal level of the audio signal filtered using the first bandpass filter within the first defined frequency range;

computing, for the first defined frequency range, a difference between the measured signal level and a threshold level;

generating filter coefficients based, at least in part, on the computed difference; and filtering the audio signal using the generated filter coefficients applied to limit the signal level of the audio signal and reduce distortion in audible output of the audio output device.

16. The one or more tangible computer-readable storage media of claim 15, wherein the process further comprises calculating attack, hold, and release time values based, at least in part, upon preset time inputs, wherein the operation of generating filter coefficients further comprises generating the filter coefficients based, at least in part, on the calculated attack, hold, and release time values.

17. The one or more tangible computer-readable storage media of claim 15, wherein the process further comprises determining whether the signal level is increasing or decreasing and a period of time of increase or decrease, respectively, and the operation of computing the difference further includes determining a cutting value by adjusting the computed difference based, at least in part, upon the period of time of increase or decrease, wherein generating the filter coefficients is based, at least in part, on the cutting value.

18. The one or more tangible computer-readable storage media of claim 15, wherein the filtering operation is performed by a recursive infinite impulse response (IIR) filter with a parametric output curve centered on the defined frequency range.

19. The one or more tangible computer-readable storage media of claim 15, wherein the operations of applying, measuring, computing, generating, and filtering together comprise a distinct bandwidth process, and the operation for performing the computer process implements the performance of the distinct bandwidth process multiple times in series for a plurality of defined frequency ranges, wherein an input audio signal for each performance of the distinct bandwidth process comprises an output audio signal of an immediately prior distinct bandwidth process, and a separate threshold level is defined for each distinct bandwidth process corresponding to a respective defined frequency range.

20. The one or more tangible computer-readable storage media of claim 15, wherein the process further comprises:

applying, to the audio signal of the audio output device, a second bandpass filter for a second defined frequency range known to cause distortion in the audio output device to the filtered audio signal;

measuring a signal level of the filtered audio signal filtered using the second bandpass filter within the second defined frequency range;

computing, for the second defined frequency range, a second difference between the measured signal level and the threshold level of the filtered audio signal;

generating second filter coefficients based, at least in part, on the computed second difference; and filtering the audio signal filtered using the filter coefficients using the generated second filter coefficients applied to further limit a second signal level of the audio signal to reduce distortion in audible output of the audio output device.

* * * * *